United States Patent Office 3,395,671
Patented Aug. 6, 1968

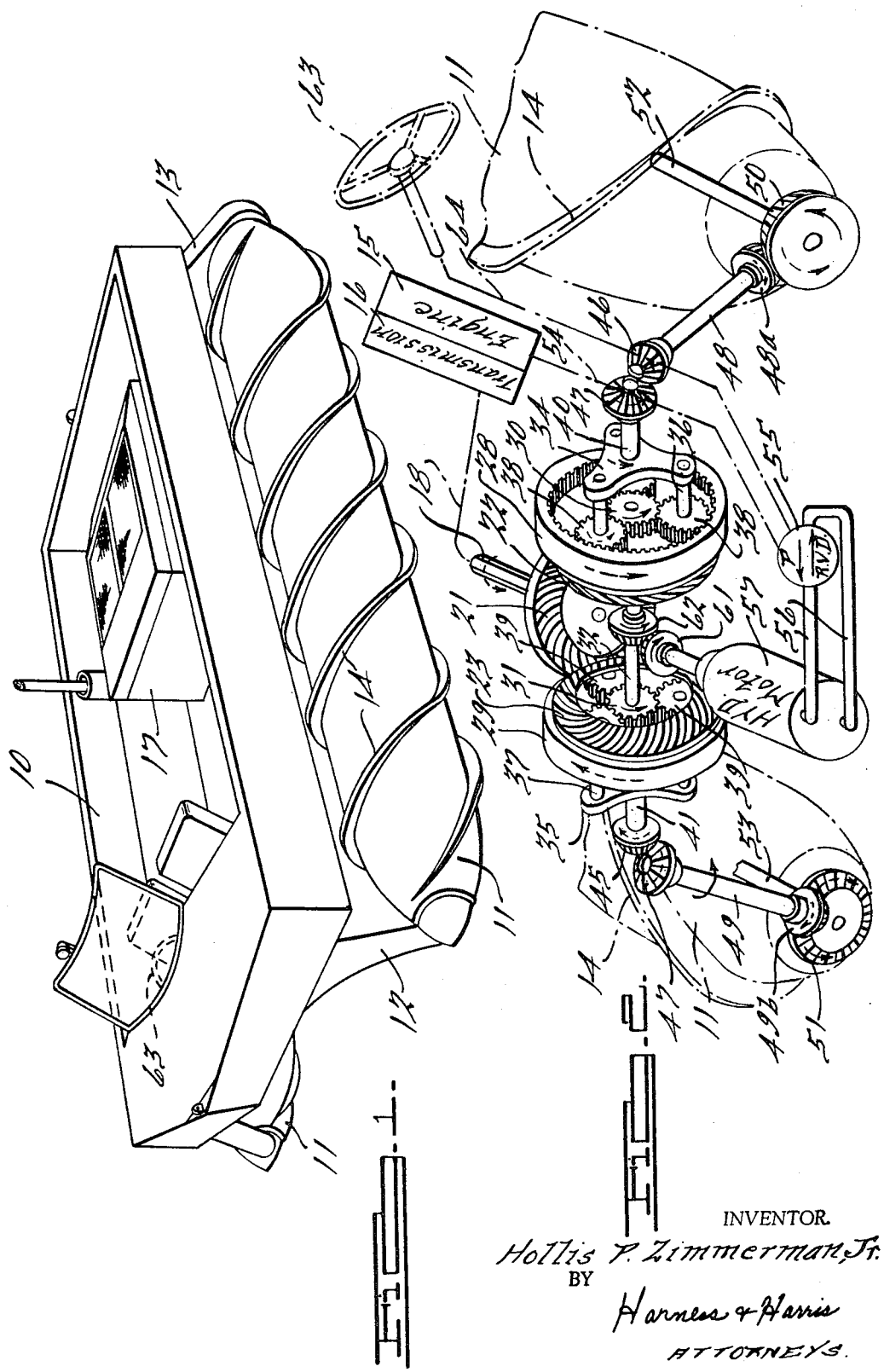

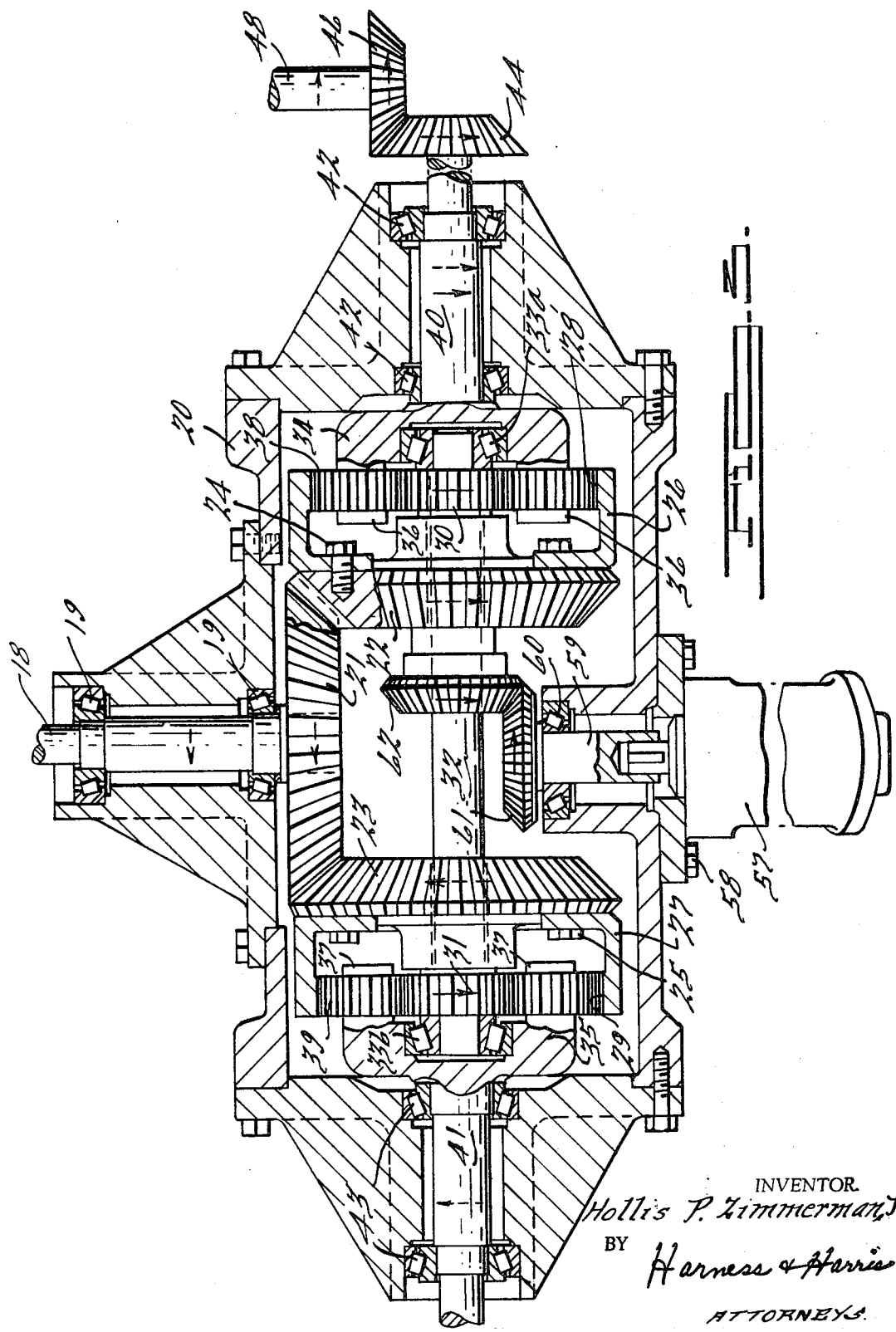

3,395,671
STEERING DEVICE FOR AMPHIBIOUS VEHICLE
Hollis P. Zimmerman, Jr., Rochester, Mich., assignor to Chrysler Corporation, Highland Park, Mich., a corporation of Delaware
Filed May 16, 1966, Ser. No. 550,261
7 Claims. (Cl. 115—1)

ABSTRACT OF THE DISCLOSURE

An amphibious type vehicle, supported on and propelled by a pair of rotatable screw type pontoons having oppositely wound ground engaging screws at is opposite sides, is controlled by means of a pair of planetary gear systems comprising a pair of coaxial ring gears connected with a propelling motor for rotation thereby in opposite directions, a pair of coaxial sun gears conected with a steering control motor for rotation thereby in the same direction, and a pair of planet gears, the planet gear in each gear system intermeshing with the sun gear and ring gear of that system to rotate about the intermeshed sun gear and being connected with one of each of the pontoons to rotate the same in a direction opposite to the direction of rotation of the other pontoon when the propelling motor is operated to rotate said ring gears and said steering control motor is inoperative.

---

This invention relates to improvements in a steering device for an amphibious-type vehicle adapted to travel over water, marshland, snow, and the like, as well as over ordinary cross country terrain.

A common type of such a vehicle comprises a body supported on a pair of laterally disposed cylindrical pontoons extending generally longitudinally of the vehicle and rotatable about their respective axes. A helical blade or screw element is wound spirally around and secured to each pontoon and is adapted to embed into the terrain or supporting medium and to move therethrough by screw action upon rotation of the pontoons. Preferably the blades have oppositely directed screw leads and are rotated in opposite directions at the same speed in order to propel the vehicle in a straight line. Steering is accomplished by varying the speed of rotation of one or the other of the pontoons.

By virtue of the screw drive effected by the spiral blades embedding into the terrain, an appreciably different ground engaging and steering action is experienced, as compared to the usual wheeled or tread-type vehicle which depends upon a high degree of frictional engagement with the ground for its drive. At the outset, the elongated helical blades embedded into the terrain tend to resist steering movement and render steering control difficult. Also in the screw type vehicle wherein the forward drive is effected by the cam or inclined plane action of the rotating screw, frictional engagement with the terrain or supporting medium, while not entirely avoidable, is desirably at a minimum. Any change in power to one pontoon tending to vary its speed of rotation will tend to cause a similar change in rotational speed of the other pontoon. Consequently under dynamic conditions, precise and repeatable steering control is difficult and violent steering motions are sometimes induced.

An important object of the present invention has been to provide an improved steering apparatus for effecting a smooth and precisely controlled action for an amphibious vehicle of the above character, wherein steering is achieved by a hydraulically biased speed differential between the pontoons.

Another and more specific object of the present invention is to provide such a steering apparatus combining a variable speed reversible hydraulic steering control motor and a propelling motor. The latter may be a conventional internal combustion engine operably connected with a variable displacement and reversible hydraulic pump to operate the latter, which in turn is operably connected with the steering control motor. The hydraulic pump may be of the swash plate type wherein the position of the swash plate is directly controlled manually, as for example by a conventional steering wheel.

The steering speed differential is accomplished by means of two planetary gear systems, each comprising coaxial sun and ring gears interconnected by a planet gear for rotating each of the three gears in accordance with the relative rotation of the other two.

The propelling motor or engine is operably connected through a conventional multiple speed and reversible transmission with one of the gears in each planetary system; the steering control motor is operably connected with a second of the gears in each planetary system; and the third gear of each planetary system is connected with one of each of the pontoons to rotate the latter, such that upon operation of the propelling engine to rotate the gears to which it is connected, while the steering control motor is locked against rotation, the two pontoons will be rotated to propel the vehicle straight ahead, but upon acceleration of the steering control motor during continued operation of the propelling engine as before, rotation of one pontoon will be accelerated and rotation of the other pontoon will be retarded to effect a steering action.

Another object is to provide such a steering apparatus wherein the two pontoons are provided with oppositely directed ground engaging screw leads and are rotated in opposite directions by the propelling engine to propel the vehicle straight ahead when the steering control motor is locked against operation; and to provide such a steering apparatus wherein the two pontoons are rotated in the same direction to effect a sidewise movement on firm terrain when the control motor is operated and the gears operated by the propelling engine are locked against rotation.

The stepless speed control characteristic of the hydraulic pump-motor steering control system readily accomplishes smooth modulation of the relative rotational speeds of the pontoons between zero asd full speed. Also, because the hydraulic pump-motor steering control system is driven by the propelling engine, the steering rate is not dependent solely upon the transmission output, but is a function of the hydraulic pump speed and engine speed. In consequence a different maximum steering ratio is accomplished for each engine speed range, such that sharper turns are permitted when the transmission is in low gear and the vehicle speed is low for a given engine speed, and broader or less sharp turns result for the same engine speed and high vehicle speed when the transmission is in high gear.

Other objects of this invention will appear in the following description and appended claims, reference being had to the accompanying drawings forming a part of this specification wherein like reference characters designate corresponding parts in the several views.

FIGURE 1 is a perspective view of an amphibious vehicle embodying the present invention.

FIGURE 2 is a fragmentary schematic view, illustrating the steering mechanism and power train between the vehicle engine and its pontoons.

FIGURE 3 is a sectional view through the axis of the planetary gear system of the steering mechanism.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a particular embodiment of the present invention is illustrated by way of example in an amphibious vehicle having a body or passenger compartment 10 supported on a pair of elongated laterally disposed pontoons 11 by fore and aft supports 12 and 13. The pontoons 11 may be conventional and are preferably hollow and generally cylindrical shells filled with a buoyant water impervious plastic foam adapted to support the outer shell and to prevent the same from being filled with water in the event it is punctured. Wound helically around each pontoon and secured thereto are two blades 14 effective to embed into the terrain or supporting medium and to propel the vehicle by screw action.

The body 10 carries a suitable engine 15 and power transmission unit 16, which may be conventional and are confined within a housing 17 open to the atmosphere. The engine 15 is the propelling motor for the vehicle and may be a conventional internal combustion engine. The transmission 16 may comprise a conventional three-speed and reverse gear mechanism coupled with the engine 15 by a conventional torque converter and having a rotatable power take-off propelling shaft 18 journaled at its rear end in a pair of axially spaced bearings 19 supported by a housing 20 for a pair of planetary gear systems.

The rear end of the transmission driven shaft 18 is keyed coaxially to a beveled propelling gear 21 to rotate the same, which is meshed at its diametrically opposite sides with a pair of ring driving gears 22 and 23 to rotate the latter in opposite directions with respect to each other. The gears 22 and 23 are coaxial with an axis normal to the axis of shaft 18 and are secured by bolts 24 and 25 to brackets 26 and 27 integral with ring gears 28 and 29 respectively. The ring gears 28 and 29 extend coaxially around inner sun gears 30 and 31 respectively which are keyed coaxially to a common shaft 32 for rotation therewith. The latter extends coaxially and rotatably through the gears 22 and 23 and is journaled at its opposite end in bearings 33a and 33b mounted within central hub portions of a pair of rotatable carriers 34 and 35 respectively. The latter rotate coaxially with shaft 32 and carry a plurality of axially extending spindles 36 and 37, which are equidistant radially from the axis of rotation and on which are rotatably mounted a corresponding plurality (three in the present instance) of planet gears 38 and 39 intermeshed with the ring and sun gears 28, 30 and 29, 31 respectively. Keyed to the carriers 34 and 35 for rotation coaxially therewith are connecting shafts 40 and 41 journaled within the housing 20 by means of two pairs of axially spaced bearings 42 and 43. The outer ends of the shafts 40 and 41 are keyed coaxially to beveled connecting gears 44 and 45 respectively which in turn are meshed with beveled connecting gears 46 and 47 keyed respectively to connecting shafts 48 and 49 for driving the right and left pontoons 11.

The driving means for the right pontoon 11 comprises a beveled gear 48a keyed coaxially to the lower end of shaft 48 and in mesh with the forward face of a beveled gear 50 coaxial with the right pontoon 11 and secured thereto by means of a coaxial pontoon driving shaft 52. The left pontoon 11 is driven by means of a beveled gear 49b keyed coaxially to the lower end of shaft 49 and meshed with the rear face of a beveled gear 51 coaxial with the left pontoon 11 and connected thereto by means of a coaxial pontoon driving shaft 53. It is also to be noted that the helical blades 14 of the right pontoon 11 have a left-hand lead so as to propel the vehicle forward upon counterclockwise rotation, whereas the helical blades 14 of the left pontoon 11 have a right-hand lead so as to propel the vehicle forward upon clockwise rotation. Accordingly, during forward motion of the vehicle, the pontoons 11 will rotate in opposite directions to each other so as to avoid sidewise drift.

In accordance with the foregoing, operation of the gear mechanism to propell the vehicle forward is indicated by the dotted arrows and is accomplished by counterclockwise rotation of propelling shaft 18 and gear 21, looking forward along the shaft 18, when the sun gears 30 and 31 are locked against rotation. The gears 22, 28 and 23, 29 will then be rotated in opposite directions to rotate the planet gears 38 and 39 and also the carriers 34 and 35 in opposite directions, thereby to rotate gear 50 counterclockwise and gear 51 clockwise, FIGURE 2.

Steering control for the vehicle is accomplished by means of an operable connection 54 between the engine 15 and a reversible variable delivery hydraulic pump 55, which may be of conventional construction and which is operably connected by conduits 56 with a variable speed reversible steering control hydraulic motor 57. The latter is secured to the housing 20 by bolts 58 and has a rotatable steering control shaft 59 journaled in bearings 60 contained within a portion of the housing 20. The forward end of shaft 59 is keyed coaxially to a beveled steering control gear 61 to rotate the same, which in turn is meshed with steering control gear 62 keyed coaxially to shaft 32 to rotate the latter.

Operation of the gear mechanism to effect at left turn is indicated by the solid arrows. During counterclockwise rotation of shaft 18 to propel the vehicle forward as aforesaid, simultaneous operation of the steering control motor 57 to rotate gear 61 clockwise in FIGURE 2 will rotate gear 62 and shaft 32 counterclockwise, thereby to rotate the sun gears 30 and 31 counterclockwise in FIGURE 2 to accelerate the rate of rotation of the planet gears 38 and carrier 34 and decelerate the rate of rotation of the planet gears 39 and carrier 35 and effect a left-hand turning motion for the vehicle by accelerating the counterclockwise rotation of the right pontoon 11 and decelerating the clockwise rotation of the left pontoon 11. Operation of motor 57 to rotate gear 61 oppositely from the direction indicated by the solid arrow will of course have the opposite steering effect.

When the shaft 18 and gears 22 and 23 are locked against rotation, as for example when the transmission is locked in a neutral position, rotation of gear 61 in the direction of the solid arrow will cause rotation of the planet gears in the direction indicated by the solid arrows, thereby to rotate the carrier 34 and right pontoon 11 counterclockwise as indicated by the solid arrows. The same direction of rotation of the sun gear 31 when shaft 18 is not rotating will cause rotation of the carrier 35 and gear 45 in the direction indicated by the solid arrows, so as to rotate the left pontoon 11 counterclockwise, also as indicated by the solid arrows. This operation will result in leftward sidewise movement of the vehicle on firm terrain, or will cause the vehicle to turn or spin sharply on soft terrain. Obviously, the reverse operation of control motor 57 so as to rotate gear 61 in the opposite direction from the solid arrow shown, while shaft 18 and gears 22 and 23 are locked against rotation, will have the reverse effect and enable rightward sidewise movement of the vehicle on firm terrain.

Operation of the hydraulic motor 57 to lock the latter against movement or to rotate the same in one direction or the other may be manually controlled by means of a conventional steering wheel 63 operably connected as indicated schematically at 64 with the pump 55 to control the latter's speed and direction of operation. Thus a conventional swash plate type pump 55 may be employed, wherein the position of the swash plate is controlled directly by the steering wheel assembly, or the pump 55 may be one of many other conventional constructions operably connected with the steering wheel 63.

Having thus described my invention, I claim:

1. In an amphibious type vehicle, means for supporting and propelling said vehicle comprising a pair of rotatable pontoons extending longitudinally of said vehicle at its opposite sides and having oppositely wound ground engaging screw elements, a separate planetary gear system associated with each pontoon to rotate the same, each gear system comprising an associated ring gear means, sun gear means, and planet gear means interconnecting the associated sun and ring gear means for operating each of the associated gear means in accordance with the relative operation of the other two, means for supplying power to said pontoons to propel said vehicle comprising a propelling motor, propelling means connecting said propelling motor with one of the gear means of each gear system to operate the same, connecting means connecting a second of the gear means of each gear system with the associated pontoon to rotate said pontoons in opposite directions with respect to each other to propel said vehicle when said one gear means of each gear system is operated by said propelling motor and the third gear means of each gear system is not operating, means for steering said vehicle comprising a steering control motor, and control means connecting said steering control motor with the third gear means of each gear system to operate the same, said means connecting one of said motors with the gear means of each system including means for operating the latter gear means in opposite directions with respect to each other, and said means connecting the other of said motors with the gear means of each system including means for operating the latter gear means in the same direction with respect to each other.

2. In the combination according to claim 1, said sun gear means comprising a pair of coaxial sun gears, one in each gear system, said ring gear means comprising a pair of coaxial ring gears, one in each gear system, said planet gear means including a pair of planet gears, one in each gear system intermeshing with the sun gear and ring gear of that system to rotate about the intermeshed sun gear, said propelling means and control means comprising means for connecting one of said motors with one pair of the three pairs of gears to rotate said one pair of gears in the same direction and also comprising means for connecting the other of said motors with a second pair of said three pairs to rotate the gears of said second pair in opposite directions, and said connecting means comprising means for connecting the third pair of said three pairs with said pontoons to rotate the latter in opposite directions.

3. In the combination according to claim 2, said propelling means and control means comprising means for connecting one of said motors with one pair of said coaxial gears to rotate the same in the same direction and also comprising means for connecting the other of said motors with the other pair of said coaxial gears to rotate the same in opposite directions, and said connecting means comprising means for connecting said pair of planet gears with said pontoons respectively to rotate the latter in opposite directions.

4. In the combination according to claim 1, said sun gear means comprising a pair of sun gears, a common shaft secured coaxially to said sun gears to rotate in unison therewith, said ring gear means comprising a pair of coaxial ring gears, driving means operably connected with each of said ring gears for rotating the same in opposite directions with respect to each other, said propelling means and control means comprising means for connecting one of said motors with said shaft to rotate the same and also comprising means for connecting the other of said motors with said driving means to rotate said ring gears in said opposite directions, and said connecting means comprising means connected with said planet gear means.

5. In the combination according to claim 4, said driving means comprising a driving gear spaced between and coupled with each of said ring gears, said control means comprising means for connecting said control motor with said shaft to rotate the same upon operation of said control motor, said propelling means comprising means for connecting said propelling motor with said driving gear to rotate the same.

6. In the combination according to claim 5, said planet gear means including a separate planet gear in each system intermeshing with the sun gear and ring gear of that system to rotate about the intermeshed sun gear in a direction opposite to the direction of corresponding rotation of said driving gear when said sun gears are not rotating.

7. In the combination according to claim 6, said control motor comprising a hydraulic motor, fluid pump means operably connected with said propelling motor to be operated thereby and operably connected with said control motor to operate the latter, and manually operated means for controlling the speed of said pump means.

References Cited

UNITED STATES PATENTS

| 2,027,218 | 1/1936 | Armington | 180—6.44 X |
| 2,336,912 | 12/1943 | Zimmermann | 180—6.44 X |
| 2,379,235 | 6/1945 | Hughes. | |
| 2,706,958 | 4/1955 | Cutting et al. | 180—7 X |
| 2,950,634 | 8/1960 | Clark et al. | 74—720.5 X |

FOREIGN PATENTS

| 586,991 | 11/1959 | Canada. |
| 714,061 | 11/1941 | Germany. |

BENJAMIN HERSH, *Primary Examiner.*

J. A. PEKAR, *Assistant Examiner.*